US008706928B2

(12) United States Patent
Mostinski et al.

(10) Patent No.: US 8,706,928 B2
(45) Date of Patent: Apr. 22, 2014

(54) INTEGRATED CIRCUIT AND METHOD FOR REDUCING VIOLATIONS OF A TIMING CONSTRAINT

(75) Inventors: Roman Mostinski, Jerusalem (IL); Lavi Koch, Tel Aviv (IL); Leonid Smolyansky, Zichron Yakov (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/504,737

(22) PCT Filed: Nov. 26, 2009

(86) PCT No.: PCT/IB2009/055364
§ 371 (c)(1),
(2), (4) Date: Apr. 27, 2012

(87) PCT Pub. No.: WO2011/064620
PCT Pub. Date: Jun. 3, 2011

(65) Prior Publication Data
US 2012/0226833 A1    Sep. 6, 2012

(51) Int. Cl.
*G06F 3/00* (2006.01)
*G06F 5/00* (2006.01)
(52) U.S. Cl.
USPC .......................................................... 710/57
(58) Field of Classification Search
USPC .......................................................... 710/57
See application file for complete search history.

(56) References Cited

U.S. PATENT DOCUMENTS

| 6,359,882 | B1 * | 3/2002 | Robles et al. ............... 370/389 |
| 7,243,351 | B2 * | 7/2007 | Kundu ....................... 718/102 |
| 8,171,187 | B2 | 5/2012 | Rozen et al. |
| 8,194,755 | B2 * | 6/2012 | Lin et al. ................. 375/240.25 |
| 2004/0006665 | A1 | 1/2004 | Moss |
| 2007/0005908 | A1 | 1/2007 | Lakshmanamurthy et al. |
| 2008/0244192 | A1 | 10/2008 | Uchiyama |
| 2009/0150891 | A1 * | 6/2009 | Matsa et al. ............... 718/103 |

FOREIGN PATENT DOCUMENTS

WO    03/100625 A1    12/2003

OTHER PUBLICATIONS

International Search Report and Written Opinion correlating to PCT/IB2009/055364 dated Aug. 26, 2010.

* cited by examiner

*Primary Examiner* — Chun-Kuan Lee

(57) ABSTRACT

An integrated circuit comprises a shared resource for providing data to a buffer. The buffer is coupled to a buffer level monitor and a filling circuit. An access-requesting circuit is coupled to the shared resource for receiving the data from the shared resource when the access-requesting circuit has access to the shared resource. An arbiter is coupled to the shared resource, the filling circuit, and the access-requesting circuit, for receiving access requests from the filling circuit and from the access-requesting circuit, and for granting to a selected one thereof access to the shared resource. A controller is coupled to the buffer level monitor and to the access-requesting circuit, for causing the access-requesting circuit to reduce a rate of access requests sent to the arbiter when a condition involving the monitored level of data in the buffer indicates an anticipated violation of a timing constraint.

20 Claims, 3 Drawing Sheets

INTEGRATED CIRCUIT AND METHOD FOR REDUCING VIOLATIONS OF A TIMING CONSTRAINT

FIELD OF THE INVENTION

This invention relates to an integrated circuit and a method for reducing violations of a timing constraint.

BACKGROUND OF THE INVENTION

Typical computing systems, such as personal computers, portable phones netbooks etc, have architectures that comprise several logic circuits that concurrently use one or more shared resources. The access to the shared resource is controlled by an arbiter. The arbiter can receive access requests from one or more access-requesting circuits and apply an arbitration algorithm in order to determine which access request to grant. Examples of such an arbitration algorithm are a round robin arbitration algorithm, a prioritized arbitration algorithm, a weighted arbitration algorithm, and the like.

Examples of such a shared resource include a memory unit, a bus, an interconnecting circuit, and the like. Examples of an access-requesting circuit include a processor, a controller, a direct memory access (DMA) controller, a dedicated hardware and the like.

An access-requesting circuit can be requested to execute an application that requires a supply of data under a timing constraint. Examples of such a timing constraint may include a minimal data retrieval rate, a fixed data retrieval rate, a minimal response period and the like. Examples of such an application include video decoding, video displaying, real time applications and the like.

However, the access-requesting circuit may be unable to respect the timing constraint when the circuit does not obtain enough data from the shared resource. Such a violation may for example occur when the arbiter does not grant enough of the access requests for the access-requesting circuit or does not grant such access requests fast enough.

SUMMARY OF THE INVENTION

The present invention provides an integrated circuit and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
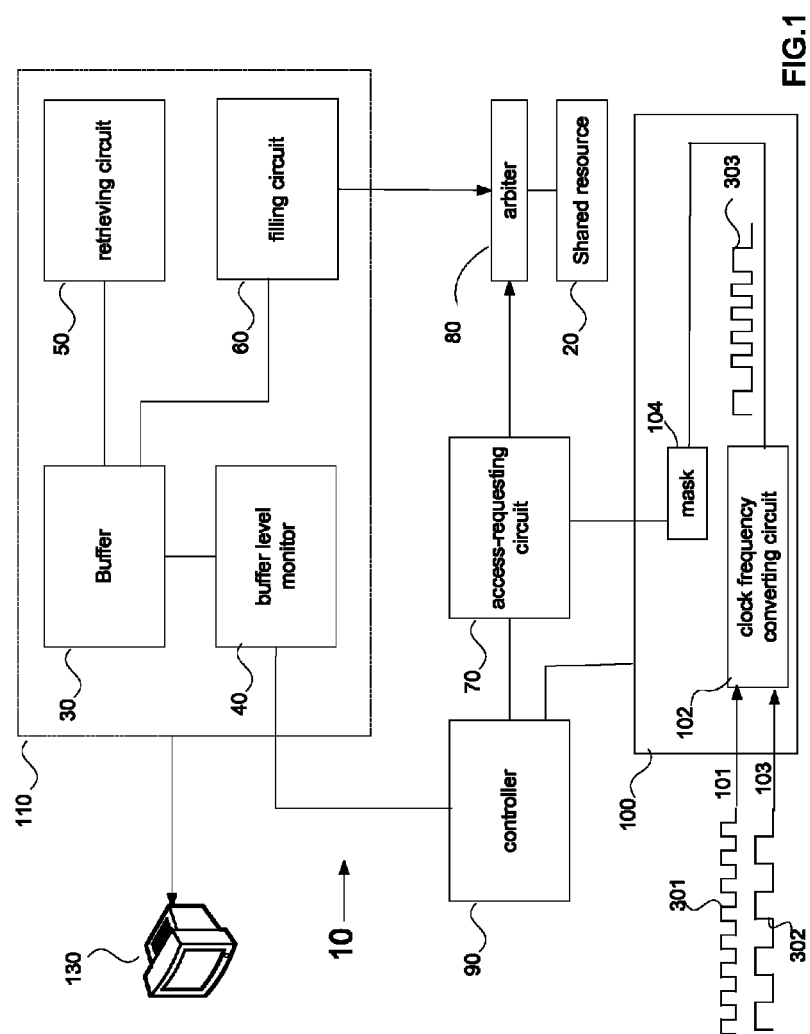
FIG. 1 schematically shows a block diagram of an example of an embodiment of an integrated circuit and a display.

Referring to FIG. 1 examples of an integrated circuit 10 and a display 130 are shown therein. At the display, information such as video or otherwise, may be outputted visually, in a for humans perceptible form. The display may for example be a display of a computer monitor, of a portable device such as a mobile phone or electronic book reader or any other suitable type of display.

The integrated circuit 10 includes a shared resource 20, a buffer 30, a buffer level monitor 40, a retrieving circuit 50, a filling circuit 60, an access-requesting circuit 70, an arbiter 80, a controller 90 and a clock generator 100. The buffer 30 is coupled to the buffer level monitor 40, the retrieving circuit 50 and the filling circuit 60. The arbiter 80 is coupled to the filling circuit 60, to the access-requesting circuit 70 and to the shared resource 20. The controller 90 is coupled to the buffer level monitor 40, to the access-requesting circuit 70 and to the clock generator 100.

As shown, the integrated circuit 10 may comprise a display controller 110 which comprises the buffer 30, the buffer level monitor 40, the retrieving circuit 50 and the filling circuit 60. The display controller 110 is an example of a circuit operating with a time-constraint, and the display controller 10 is expected to provide data to the display 130 according to a timing constraint. For instance, a task of the display controller 110 may be to perform a screen refresh to the display 130. If the access-requesting circuit 70, or other access-requesting circuits, use the shared resource 20 and send a high amount of access requests, the display controller may not get access to the shared resource 20 to receive the data for the screen refresh in time, which may lead to the display visual content being distorted.

The shared resource 20 may be implemented in any manner suitable for the specific implementation and may, for example, be a memory unit that stores data, a bus or an interconnecting circuit through which the data propagates, a processing unit that should process the data before the data is sent to the buffer 30, and the like. The shared resource 20 is shared by various components such as the display controller 110 and the access-requesting circuit 70.

In the buffer 30, data from the shared resource waiting to be processed by the retrieving circuit 50 may be stored temporarily. The buffer 30 may be implemented in any manner suitable for the specific implementation, and for example be a on-chip memory of the integrated circuit to which the retrieving circuit 50 has access. The retrieving circuit 50 can retrieve data from the buffer 30 and process the data, for example to render the data into signals suitable to be processed by an external device, external from the integrated circuit 10, such as the display 130 in this example. The operation of the retrieving circuit 50 is subject to a timing constraint, e.g. to avoid that the display has a visual artefact the retrieving circuit 50 has to output, and therefore process, images to the display at a sufficiently high rate. The retrieving circuit 50 is thus required to retrieve the data according to a timing constraint, such as but not limited to a minimal retrieval rate.

The filling circuit 60 is coupled to the buffer and can write data to the buffer 30. The filling circuit 60 is also coupled to the shared resource 20 to receive the data from the shared resource 20 when the filling circuit has been granted access to the shared resource 20. The filling circuit 60 is coupled to the arbiter 80 and can send access requests to the arbiter 80.

A limited number of circuits, e.g. one, may allowed to use the shared resource 20 simultaneously. The arbiter 80 controls the data transfers from the shared resource 20 by receiving access requests (e.g. in this example from the filling circuit 60 and from the access-requesting circuit 70) and granting, in response to an access request, to only a selected circuit thereof access to the shared resource 20. The selected circuit can, after access has been granted, access the shared resource 20 and for example receive data from the shared resource while the not-selected circuit(s) will be blocked by the arbiter from access in the shared resource 20. The arbiter 80 arbitrates between access requests by applying an arbitration process that has an arbitration latency. The arbitration process may be any suitable arbitration process, such as but not limited to round robin arbitration, prioritized arbitration, weighted arbitration or other suitable arbitration.

The access-requesting circuit 70 is arranged to request, e.g. from the arbiter 80, access to the shared resource 20 in order to be allowed to receive data therefrom. The access-requesting circuit 70 may operate independently from the retrieving circuit 50. The access-requesting circuit 70 may process data without timing constraints or under timing constraints more relaxed than the timing constraint associated with the display controller 110. For example, the access-requesting circuit 70 can execute a background application that can be completed within a very long period and can tolerate delays and even temporary halts.

The buffer level monitor 40 is arranged to monitor a level of data in the buffer 30. The buffer level monitor 40 may monitor the level in any manner suitable for the specific implementation. The monitor 40 may for example monitor the level of data in the buffer 30 by comparing between (i) a read (retrieve) pointer that points to the last buffer entry from which data was retrieved (by the retrieving circuit 50) and (ii) a write pointer that points to the last buffer entry that was written to (by the filling circuit 60), and deduce from the difference in position between the read pointer and the write pointer the monitored level of data in the buffer. The buffer level monitor 40 (or the controller 90) may also monitor other parameters of the buffer, such as the rate of change in the level of data in the buffer 30 by comparing between the levels of data in the buffer 30 at different points in time.

As shown, the controller 90 is coupled to the buffer monitor 40 and may receive from the buffer monitor information about the monitored level of data in the buffer 30. The controller 90 is arranged to cause the access-requesting circuit 70 to reduce a rate of access requests sent to the arbiter 80 if when a condition is fulfilled which indicates an anticipated violation of the timing constraint, such as for example that the monitored level of data in the buffer 30 comes in a range indicative of an anticipated violation of the timing constraint, e.g. when the monitored level equals an upper level of the range. The controller 90 can for example be arranged to send a command, a control signal or even an interrupt request to the access-requesting circuit 70 that may reduce that rate in response to the access-requesting circuit 70 reduces the rate of access requests sent to the arbiter 80. It will be apparent that the controller 90 can continue to evaluate the level of data in the buffer 30 after a reduction in the rate of access requests has been cause and that the reduction may be performed temporarily, during a suitable time interval, after which the clock frequency may be reset to the frequency before the reduction.

If the rate reduction prevented the violation of the timing constraint, the controller 90 can cause the access-requesting circuit 70 to maintain the lowered rate of access requests or even can cause the access-requesting circuit 70 to increase the rate of its access requests. If the rate reduction did not reduce the probability of an occurrence of a timing violation then the controller 90 can cause to perform another reduction of the rate of access requests and even to stop sending access requests.

The controller 90 can cause the rate reduction in any manner suitable for the specific implementation and for example cause this rate reduction by slowing down the processing frequency of the access-requesting circuit 70. The processing frequency may for example be reduced by reducing the frequency of a clock signal that is provided (by the clock generator 100) to the access-requesting circuit 70 and which clock signal is used to clock the operation of the access requesting circuit 70. Circuits of which the operation is clocked by a clock signal are generally known in the art, e.g. clocked central processing units, and are for sake of brevity not described in further detail. The controller 90 can for example prevent the access-requesting circuit 70 from receiving a clock signal, i.e. reduce the clock frequency to 0 Hz. Thereby the access-requesting circuit will be halted and thus the access-requesting circuit 70 is prevented from sending access requests.

As mentioned above, in the shown example, the clock generator 100 is arranged to provide a clock signal to the access-requesting circuit 70. The clock generator 100 can include a clock frequency selecting circuit 102 that has two inputs—a first input 101 for receiving a first reference clock signal 301 with a first frequency and a second input 103 for receiving a second reference clock signal 302 having a second frequency. The second frequency is lower than the first frequency of the first reference clock signal. The clock frequency selecting circuit 102 is arranged to select a selected clock signal from the first and second reference clock signals and to output the selected clock signal 303 to the access-requesting circuit 70. The circuit may for example comprise a single switch or a multiplexer coupled with its inputs to the inputs 101 and 103 and with a control input to a controller which can set the switch or multiplexer in a suitable position corresponding to the selected clock signal 303.

The clock signal that is being outputted from the clock generator 100 can be gated. This is illustrated by a mask 104. The mask 104 is included in the clock generator 100 and is situated, in a processing direction of the clock signal, between the clock frequency selecting circuit 102 and the access-requesting circuit 70. The mask 104 can gate the clock signal outputted from the clock frequency selecting circuit 102.

The probability of an occurrence of a timing violation can be reflected by the level of data in the buffer 30. A first rate reduction can be triggered when the level of the data in the buffer 30 reaches a first threshold. A second rate reduction can be triggered when the level of the data in the buffer 30 reaches a second threshold.

The level of data in the buffer 30 that is regarded as indicative of an anticipated violation of the timing constraint may for example be a predetermined, fixed or dynamic, threshold and can be calculated by the integrated circuit 10 or can be calculated by another entity (that is not a part of the integrated circuit 10) and then be provided to the controller 90. The controller 90 may compare this calculated level with the actual level in the buffer 30 as monitored by the buffer monitor 40, so to determine whether or not a violation is to be anticipated and if so, in response thereto, control the circuit 70 to reduce the access request rate.

The level of data in the buffer 30 that is regarded as indicative of an anticipated violation can be determined off-line (for example—it can be calculated during the design process of the integrated circuit or be determined by experimenting and observing at which level of data in the buffer the violations of the timing start occurring). The determination may include simulating the changes in the level of data in the buffer and especially changes in the level of data that result from the arbitration process and from the behaviour of the access-requesting circuit 70. These changes may be attributed to different parameters such as the arbitration latency, the arbitration algorithm that is being applied by the arbiter, the rate of access requests generated by the access-requesting circuit 70 and the like.

The level of data in the buffer 30 that is indicative of an anticipated violation of the timing constraint may for example be calculated taking into account various parameters, such as but not limited to:

(i) the length of the arbitration process—longer arbitration latencies may increase the probability of a violation of the timing constraint and this increment may be addressed by increasing the level of data in the buffer 30 that is indicative of an anticipated timing violation, (ii) the maximal rate of access requests sent to the arbiter 80 by the access-requesting circuit 70—higher maximal rates may increase the probability of a violation of the timing constraint, (iii) a prioritization (if any) that is given to access requests sent by the display controller 110, (iv) the manner in which the rate of access requests generated by the access-requesting circuit 70 can be reduced—especially the time it takes for reducing the rate of access requests, whether the access requests can be entirely stopped or just slowed down. Summarizing: an ability to perform rapid and dramatic rate reductions can reduce the probability of a violation of the timing constraint and may therefore lead to a lower level of the data in the buffer 30 being regarded as indicative of an anticipated violation.

Figure 2:
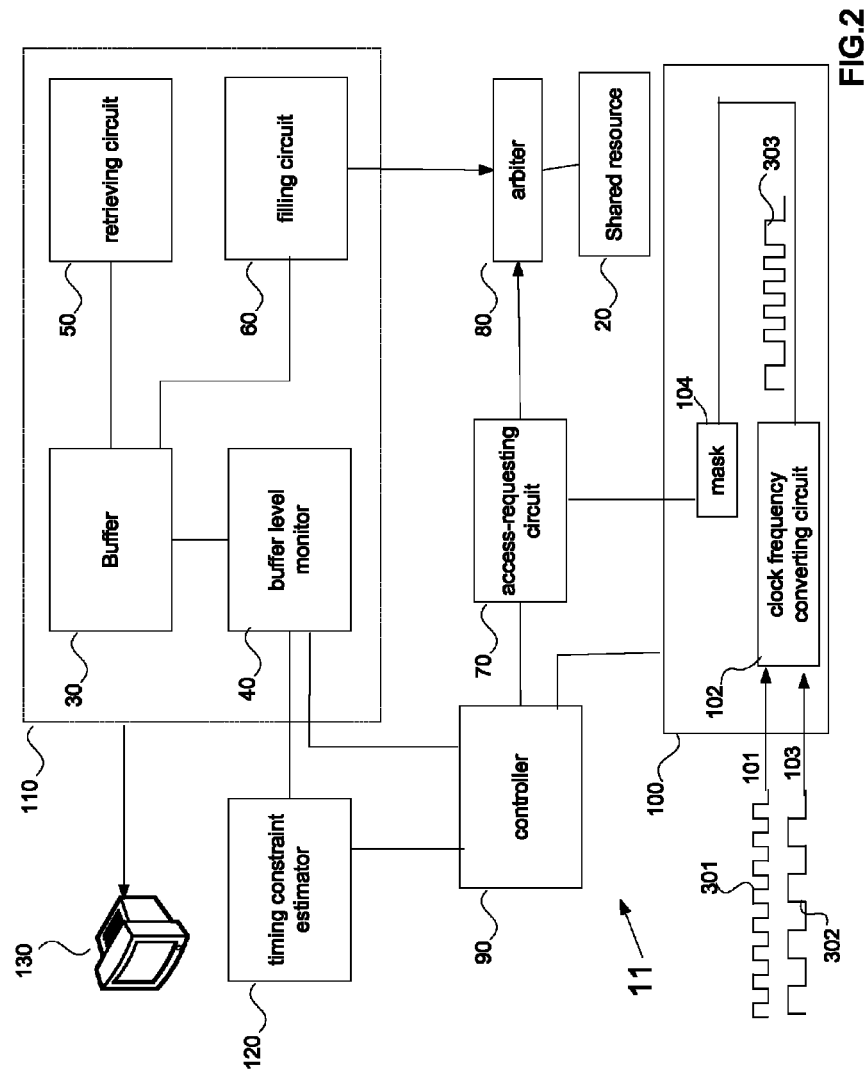
FIG. 2 schematically shows a block diagram of another example of an embodiment of an integrated circuit and a display.

FIG. 2 is a block diagram of another example of an integrated circuit 11 and a display 130. For sake of brevity, the operation of components of the circuit corresponding to those already described with reference to the circuit 10 of FIG. 1 will not be repeated.

In addition to the components of the integrated circuit 10 of FIG. 1, the integrated circuit 11 of FIG. 2 comprises a timing constraint violation estimator 120. The timing constraint violation estimator 120 is coupled to the buffer level monitor 40 and to the controller 90. The timing constraint estimator violation 120 can estimate a probability of an occurrence of an anticipated violation of the timing constraint. The timing constraint estimator violation 120 can be arranged to estimate the probability occurrence of the anticipated violation of the timing constraint based on the level of data in the buffer as well as on other parameters. Examples of such other parameters include a rate of with which the level of data in the buffer changes, and an arbitration latency of the arbiter.

The timing constraint violation estimator 120 outputs an anticipated timing constraint violation indicator if it anticipates, i.e. determines likely, that a timing constraint violation will occur. For instance, the timing constraint violation estimator 120 may calculate based on the level of data and one or more other parameters a probability of a timing constraint violation and output the indicator if the probability is above a predetermined, fixed or dynamic, threshold. The timing constraint violation indicator is sent to the controller 90. Once the controller 90 receives the timing constraint violation indicator it causes the access-requesting circuit 70 to reduce the rate of access requests to be sent to the arbiter 80.

Figure 3:
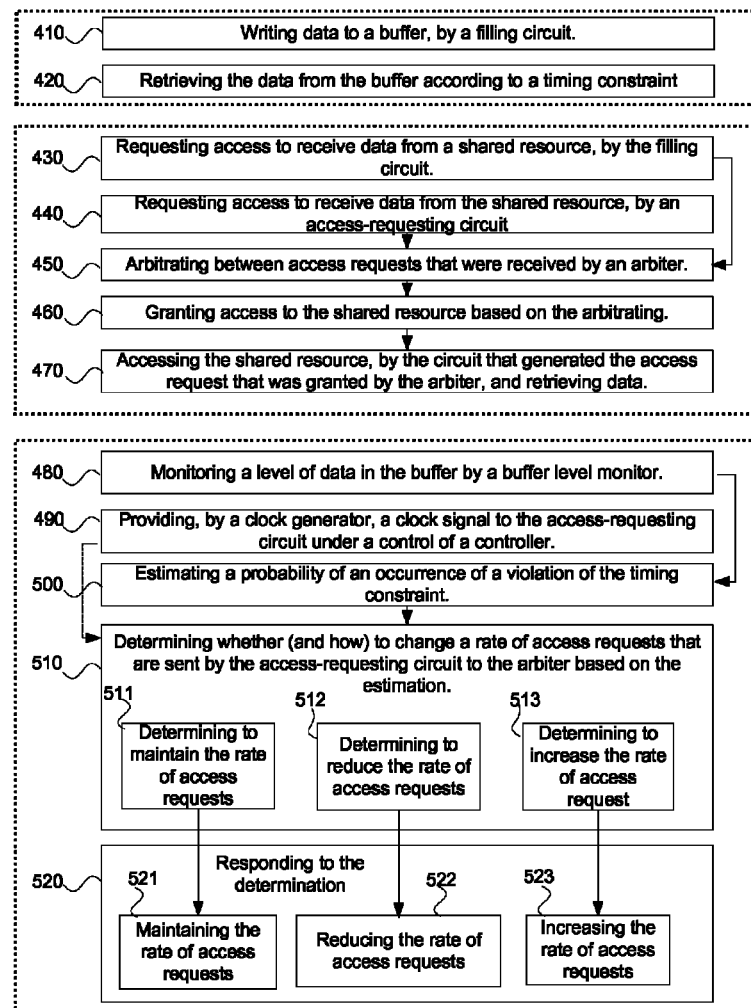
FIG. 3 schematically shows a flowchart of an example of a method for reducing violations of a timing constraint.

FIG. 3 schematically shows an example of a method 400 for reducing violations of a timing constraint. For illustrative purposes, different stages are shown in this figure. However, it will be apparent that the method may be a continuous operation which cannot be dissected in discrete steps.

For example, FIG. 3 shows multiple stages that can be executed by different components of an integrated circuit in a pipelined manner. Accordingly, while one stage is executed another stage may be completed or be executed and the stages may have a (partial) overlap in time. Furthermore, FIG. 3 shows multiple groups of stages. These groups of stages can be executed in parallel to each other, in an overlapping manner or in a partially overlapping manner. Each group of stages can be repeated multiple times.

A first group of stages includes writing data to a buffer, e.g. by a filling circuit (stage 410), and retrieving the data from the buffer according to a timing constraint (stage 420), which can be executed by a retrieving circuit.

A second group of stages includes requesting access to receive data from a shared resource, e.g. by the filling circuit, state 430 and requesting access to receive data from the shared resource, by an access-requesting circuit, (stage 440). In the shown flow-chart, stages 430 and 440 are followed by (stage 450) arbitrating between access requests that were received by an arbiter. These access requests were generated during either one of stages 430 and 440. Stage 450 is followed by (stage 460) granting access to the shared resource based on the arbitrating, which executed by the arbiter. Stage 460 is followed by accessing the shared resource, by the circuit that generated the access request that was granted by the arbiter, and retrieving data.

A third group of stages includes (stage 480) monitoring a level of data in the buffer. The monitoring is executed by a buffer level monitor. This may include comparing between (i) a read (retrieve) pointer that points to the last buffer entry from which data was retrieved (by the retrieving circuit) and (ii) a write pointer that points to the last buffer entry that was written to (by the filling circuit). Stage 480 can be followed by (stage 490) providing, by a clock generator, a clock signal to the access-requesting circuit under a control of a controller. The frequency of the clock signal can be altered based on the outcome of stage 510. The frequency of the clock signal can be reduced (it can even be reduced to zero) if it is estimated that an anticipated violation of the timing constraint is about to occur. A dashed line that connects box 490 to box 510 illustrates the dependency between the frequency of the clock signal and the outcome of stage 510. Stage 490 can for example be executed in parallel to stages 480, 500 and 510.

Stage 480 can further be followed by (stage 500) estimating a probability of an occurrence of a violation of the timing constraint. This can include determining that a violation of the timing constraint should be anticipated. The estimating can be based on one or more parameters. Examples of such parameters include the level of data in the buffer, a rate of changes in the level of data in the buffer, and an arbitration latency of the arbiter. The estimation can be executed by a timing constraint violation estimator. The estimating may for example include comparing the level of data in the buffer to a predefined threshold that is indicative of an anticipated violation of the timing constraint and if the level is below the threshold outputting an anticipated timing constraint violation indicator that is indicative of an anticipated violation of the timing constraint. The outputting of the anticipated timing constraint violation indicator can be followed by determining to increase the rate of access request (stage 512).

The estimation may be followed by (stage 510) determining whether (and how) to change a rate of access requests that are sent by the access-requesting circuit to the arbiter based on the estimation. This may include (stage 511) determining to maintain the rate of access requests, e.g. if, for example, it is estimated that the probability of the occurrence of the timing constraint violation is low enough, i.e. is below a predefined probability threshold.

The determining (stage 510) may alternatively or additionally include (stage 512) determining to reduce the rate of access requests or to maintain the rate of access requests. The rate of access request may for instance be lowered if, for example, it is estimated that a violation of the timing constraint should be anticipated.

The determining (stage 510) may also, alternatively or additionally, include (stage 513) determining to increase the rate of access request. This can include determining to increase the rate of access request if, for example, it is estimated that such a rise will not result in an anticipated violation of the timing constraint.

The determining (stage 510) is followed by (stage 520) responding to the determination of stage 510. The responding (stage 520) can include causing the access-requesting circuit to alter a rate of access requests to be sent to the arbiter based on the determination of stage 510 or maintaining the rate of access requests. The rate of access requests can be changed in different manners. Examples of such manners include instructing the access-requesting circuit to reduce the rate of access requests, instructing the access-requesting circuit to slow down, sending an interrupt requests to the access-requesting circuit or to another circuit (for example a core) that can control the operation of the access-requesting circuit, causing a frequency of a clock signal that is supplied to the access-requesting circuit to change and thus changing an operating frequency of the access-requesting circuit, a change that will result in a change of the rate of access requests.

The responding (stage 520) may include (stage 521) maintaining the rate of access requests, and/or (stage 522) reducing the rate of access requests and/or (stage 523) increasing the rate of access requests. In the shown flow-chart, stage 521 follows stage 511; stage 522 follows stage 512 and stage 523 follows stage 513.

Stage 522 can be triggered by the reception of the anticipated timing constraint violation indicator or by the monitored level of data in the buffer reaching a threshold that is indicative of an anticipated violation of the timing constraint. Stage 522 can include causing the access-requesting circuit to reduce a rate of access requests to be sent to the arbiter if the level of data in the buffer reaches a first threshold that is indicative of an anticipated violation of the timing constraint. Stage 522 can for instance include causing the access-requesting circuit to stop sending access requests to the arbiter if the level of data in the buffer reaches a third threshold, said third threshold being lower than the first threshold. Stage 522 can include causing the access-requesting circuit to further reduce the rate of access requests to be sent to the arbiter if the level of data in the buffer reaches a second threshold, said second threshold being lower than the first threshold.

Stage 522 can include causing a clock generator that supplies the clock signal to the access-requesting circuit to reduce the frequency of the clock signal and even to stop the supply of the clock signal to the access-requesting circuit.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

However, other modifications, variations and alternatives are also possible. The specifications and drawings are, accordingly, to be regarded in an illustrative rather than in a restrictive sense.

In the claims, the word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An integrated circuit, comprising:
a shared resource for providing data;
a buffer for storing the data;
a buffer level monitor, coupled to the buffer, for monitoring a monitored level of data in the buffer;
a retrieving circuit, coupled to the buffer, for retrieving the data from the buffer, according to a timing constraint;
a filling circuit coupled to the buffer for writing the data to the buffer and coupled to the shared resource for receiving the data from the shared resource when the filling circuit has access to the shared resource;
an access-requesting circuit coupled to the shared resource for receiving the data from the shared resource when the access-requesting circuit has access to the shared resource;
an arbiter, coupled to the shared resource, the filling circuit, and the access-requesting circuit, for receiving access requests from the filling circuit and from the access-requesting circuit, and for granting to a selected one thereof access to the shared resource; and
a controller, coupled to the buffer level monitor and to the access-requesting circuit, for causing the access-requesting circuit to reduce a rate of the access requests sent to the arbiter when a condition indicating an anticipated violation of the timing constraint is fulfilled, the condition at least involving the monitored level of data in the buffer.

2. The integrated circuit according to claim 1, wherein the condition comprises: the monitored level of data in the buffer being in a range indicative of the anticipated violation of the timing constraint.

3. The integrated circuit according to claim 1, comprising a timing constraint violation estimator for estimating a probability of the occurrence of the anticipated violation of the timing constraint based on the monitored level of data in the buffer and at least one other parameter,
which timing constraint violation estimator is coupled to the buffer level monitor for receiving an indication of said monitored level of data and
coupled to the controller for outputting an anticipated timing constraint violation indicator when said timing constraint violation is determined by the timing constraint violation estimator to be likely, and
wherein the condition comprises the controller receiving said anticipated timing constraint violation indicator.

4. The integrated circuit according to claim 1, further comprising a clock generator, coupled to the controller, for providing a clock signal to the access-requesting circuit,
wherein the controller is coupled to a control input of the clock generator, for altering a frequency of the clock signal if the monitored level of data in the buffer is indicative of the anticipated violation of the timing constraint.

5. The integrated circuit according to claim 4, wherein the controller is arranged to cause the clock generator to lower the frequency of the clock signal if the monitored level of data in the buffer is indicative of the anticipated violation of the timing constraint.

6. The integrated circuit according to claim 4, wherein the controller is arranged to cause the clock generator to stop a supply of the clock signal to the access-requesting circuit if the monitored level of data is indicative of the anticipated violation of the timing constraint.

7. The integrated circuit according to claim 4, wherein the clock generator comprises a clock frequency selecting circuit for receiving a first reference clock signal with a first frequency and a second reference clock signal having a second frequency that is lower than the first frequency, and for switching between the first and second reference clock signals for providing the clock signal to the access-requesting circuit.

8. The integrated circuit according to claim 1, wherein:
the controller is arranged to cause the access-requesting circuit to reduce the rate of the access requests to be sent to the arbiter if the monitored level of data in the buffer reaches a first threshold that is indicative of the anticipated violation of the timing constraint; and
the controller is further arranged to cause the access-requesting circuit to further reduce the rate of the access requests to be sent to the arbiter if the monitored level of data in the buffer reaches a second threshold, the second threshold being lower than the first threshold.

9. The integrated circuit according to claim 1, wherein the controller is arranged to cause the access-requesting circuit to reduce the rate of the access requests to be sent to the arbiter if the monitored level of data in the buffer reaches a first threshold that is indicative of the anticipated violation of the timing constraint, and wherein the controller is arranged to cause the access-requesting circuit to stop sending access requests from the arbiter if the monitored level of data in the buffer reaches a stop threshold, the stop threshold being lower than the first threshold.

10. The integrated circuit according to claim 9, wherein said stop threshold is below said second threshold, and wherein when said further reducing is performed the rate is larger than zero after said further reducing.

11. The integrated circuit according to claim 1, further comprising a timing constraint estimator, coupled to the buffer level monitor and to the controller, for estimating an occurrence of the anticipated violation of the timing constraint based on the monitored level of data in the buffer, and for outputting an anticipated timing constraint violation indicator that is indicative of the anticipated violation of the timing constraint, wherein the controller is arranged to cause the access-requesting circuit to reduce the rate of the access requests to be sent to the arbiter based on the anticipated timing constraint violation indicator.

12. The integrated circuit according to claim 11, wherein the timing constraint estimator is arranged to estimate the occurrence of the anticipated violation of the timing constraint based on the monitored level of data in the buffer, a monitored rate of changes in the monitored level of data in the buffer, and an arbitration latency of the arbiter.

13. The integrated circuit according to claim 1, wherein the shared resource is a memory unit, and wherein the timing constraint is a minimal retrieval rate of the data from the buffer.

14. The integrated circuit according to claim 1, wherein the retrieving circuit is coupled to a display, and wherein the controller is arranged to cause the access-requesting circuit to reduce the rate of the access requests to be sent to the arbiter if the monitored level of data in the buffer is indicative of the anticipated violation of the timing constraint, wherein the anticipated violation will cause the display to display a visual artifact.

15. A method for reducing violations of a timing constraint, the method comprising:

writing data to a buffer, by a filling circuit;
    retrieving the data from the buffer according to a timing constraint;
    monitoring a level of data in the buffer;
    requesting access to receive data from a shared resource, by the filling circuit;
    requesting access to receive the data from the shared resource, by an access-requesting circuit;
    arbitrating between access requests from the filling circuit and from the access-requesting circuit;
    granting access to the shared resource based on the arbitrating; and
    causing the access-requesting circuit to reduce a rate of access requests to be sent to the arbiter if the monitored level of data in the buffer is indicative of an anticipated violation of the timing constraint.

16. A non-transitory computer program product for running on a computer system, at least including code portions for performing steps of a method according to claim 15 when executed on a programmable apparatus.

17. The method of claim 15, wherein the reducing comprises altering a frequency of a clock signal to the access-requesting circuit to reduce the rate of access requests to be sent to the arbiter.

18. The method of claim 15, wherein the reducing comprises causing a clock generator to stop a supply of a clock signal to the access-requesting circuit.

19. The method of claim 15, wherein the reducing comprises sending an interrupt request to the access-requesting circuit to reduce the rate of access requests.

20. The integrated circuit of claim 1, wherein the buffer and arbiter are distinct components of the integrated circuit.

\* \* \* \* \*